US012095729B2

(12) United States Patent
St. Pierre et al.

(10) Patent No.: US 12,095,729 B2
(45) Date of Patent: Sep. 17, 2024

(54) FILTERING PACKETS OF NETWORK TRAFFIC USING PROBABILISTIC PATTERN MATCHING

(71) Applicant: NetScout Systems Texas, LLC, Plano, TX (US)

(72) Inventors: Brian St. Pierre, Acworth, NH (US); Timothy David Dodd, Auburn, GA (US); Steinthor Bjarnason, Fjerdingby (NO)

(73) Assignee: NETSCOUT SYSTEMS TEXAS, LLC, Westford, MA (US)

( * ) Notice: Subject to any disclaimer, the term of this patent is extended or adjusted under 35 U.S.C. 154(b) by 259 days.

(21) Appl. No.: 17/898,594

(22) Filed: Aug. 30, 2022

(65) Prior Publication Data
US 2024/0073184 A1    Feb. 29, 2024

(51) Int. Cl.
*H04L 9/40*    (2022.01)
*G06F 16/903*    (2019.01)

(52) U.S. Cl.
CPC .... *H04L 63/0236* (2013.01); *G06F 16/90335* (2019.01)

(58) Field of Classification Search
CPC ............ H04L 63/0236; G06F 16/90335
See application file for complete search history.

(56) References Cited

U.S. PATENT DOCUMENTS

| 9,979,650 | B1* | 5/2018 | Sheth | H04L 12/66 |
| 2014/0036908 | A1* | 2/2014 | Hui | H04L 45/20 370/389 |
| 2016/0254998 | A1* | 9/2016 | Jokela | H04L 45/34 370/390 |
| 2020/0186499 | A1* | 6/2020 | Benjamin | H04L 61/4511 |
| 2020/0351245 | A1* | 11/2020 | Moore | H04L 63/02 |

OTHER PUBLICATIONS

Wikimedia Foundation, Inc., "Bloom filter," Wikipedia, last edited Aug. 16, 2022, https://en.wikipedia.org/wiki/Bloom_filter, Accessed Aug. 29, 2022, 23 pages.

* cited by examiner

*Primary Examiner* — Chau Le
(74) *Attorney, Agent, or Firm* — Foley & Lardner LLP (57) ABSTRACT

A method of configuring a filter to perform pattern matching against input data is provided. The method includes receiving one or more rules, each rule including one or more field specifiers, each field specifier including a value specifier that specifies a value to be matched and a location specifier that specifies a location in the input data. For each rule of the one or more rules an empty buffer is initialized. For each field specifier the value specified by the field specifier is appended to the buffer, and the buffer contents are inserted into contents of a probabilistic data structure representing all of the field specifiers of the rule. The probabilistic data structure is configured to receive a query that includes query buffer contents determined from the input data and respond with a match status of probably present based on a predetermined probability, or definitely not present.

20 Claims, 6 Drawing Sheets

FILTERING PACKETS OF NETWORK TRAFFIC USING PROBABILISTIC PATTERN MATCHING

FIELD OF THE DISCLOSURE

Embodiments of the present disclosure relate generally to methods and systems for filtering packets of network traffic, and specifically to filtering packets of network traffic using probabilistic pattern matching.

BACKGROUND OF THE DISCLOSURE

Packets of network traffic can be filtered for various purposes, including recognizing network attacks, recognizing wanted or unwanted types of network traffic (e.g., for parental controls, targeted advertising, network searching, malicious attack recognition, DDoS attacks, etc.). In certain scenarios, application of a broad filter can be sufficient. For example, in the context of detecting a network attack, a broad filter that filters based on relatively simple criteria (such as IP address, URL, protocol type, etc.) can perform the task efficiently and quickly.

In other scenarios, the criteria are more complex and unsuitable for filtering by a broad filter. For example, it may be necessary to filter based on a complex combination of criteria. A possible solution is to use a regular expression (regex) to perform the filtering. Solutions for filtering based on complex combinations of criteria can decrease efficiency and require more time to perform. For example, a matching process using regexes can run efficiently once the regexes are compiled. However, the compilation process for large regexes can be time-consuming. Furthermore, the matching process is still significantly slower than when using a broad filter, particularly when each packet needs to be matched against multiple regexes before being passed.

Conventional methods and systems for filtering network packets have generally been considered satisfactory for their intended purpose. However, there is still a need in the art for increasing efficiency, including speed, when filtering network packets.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a method of 1. configuring a filter to perform pattern matching against input data. The method includes receiving one or more rules, each rule including one or more field specifiers, each field specifier including a value specifier that specifies a value to be matched and a location specifier that specifies a location in the input data. For each rule of the one or more rules an empty buffer is initialized. For each field specifier the value specified by the field specifier is appended to the buffer. The buffer contents are inserted into contents of a probabilistic data structure representing all of the field specifiers of the rule. The probabilistic data structure is configured to receive a query that includes query buffer contents determined from the input data and respond with a match status of probably present based on a predetermined probability, or definitely not present.

In one or more embodiments, the location specifier can include an offset specifier and a length specifier. The offset specifier specifies an offset of a data field from a reference location of the input data, and the length specifier specifies a length of the data field.

In one or more embodiments, the offset and length can be specified in bytes.

In one or more embodiments, the input data can include IP packets received on a network device.

In one or more embodiments, each rule of the one or more rules can correspond to a set of one or more actions to be performed when the match status is positive for the rule.

In one or more embodiments, a positive output match status can indicate a need for mitigation of a network attack and the set of one or more actions can include an action to mitigate the network attack.

In one or more embodiments, the probabilistic data structure can be a bloom filter.

In accordance with a further aspect of the disclosure, a method of packet filtering is provided. The method includes receiving input data and applying one or more rules. Each rule includes one or more field specifiers. Each field specifier includes a value specifier that specifies a value to be matched and a location specifier that specifies a location in the input data. Applying the one or more rules includes for each rule of the one or more rules, at least until a match is found in contents of the probabilistic data structure, initializing an empty buffer, for each field specifier in the rule extracting a value in the input data at the location in the input data specified by the location specifier and appending the extracted value to the buffer, and determining a match status of contents of the buffer relative to previously inserted contents of the probabilistic data structure. The contents of the probabilistic data structure represent field specifiers of the one or more rules, and the match status indicates whether the contents of the buffer are probably present in the contents of the probabilistic data structure based on a predetermined probability or are definitely not present in the contents of the probabilistic data structure.

In one or more embodiments, the location specifier can include an offset specifier and a length specifier, wherein the offset specifier can specify an offset of a data field from a reference location of the input data, and the length specifier can specify a length of the data field.

In one or more embodiments, the offset and length can be specified in bytes.

In one or more embodiments, the input data can include an IP packet received on a network device.

In one or more embodiments, the probabilistic data structure can be a bloom filter.

In one or more embodiments, determining a match status can include submitting a query including buffer contents to the probabilistic data structure and receiving a response from the probabilistic data structure that includes a match status. A positive match status indicates that the buffer contents match a rule contained in the probabilistic data structure.

In one or more embodiments, each rule of the one or more rules CAN correspond to a set of one or more actions to be performed when the match status is positive when processing the rule.

In one or more embodiments, when the match status is positive when processing a rule of the one or more rules, the set of one or more actions to which the rule corresponds can be caused to be performed.

In one or more embodiments, the positive match status can indicate a need for mitigation of a network attack, and the set of one or more actions can include an action to mitigate the network attack.

In accordance with further aspects of the disclosure, at least one computer system is provided. Each computer system includes a memory configured to store instructions and a processor disposed in communication with the memory. The processors of the respective computer systems, upon execution of the instructions, are configured to perform the disclosed methods. In accordance with still further aspects of the disclosure at least one non-transitory computer readable storage medium and one or more computer programs embedded therein is provided, which when executed respectively by a computer system, cause the computer system to perform the disclosed methods.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
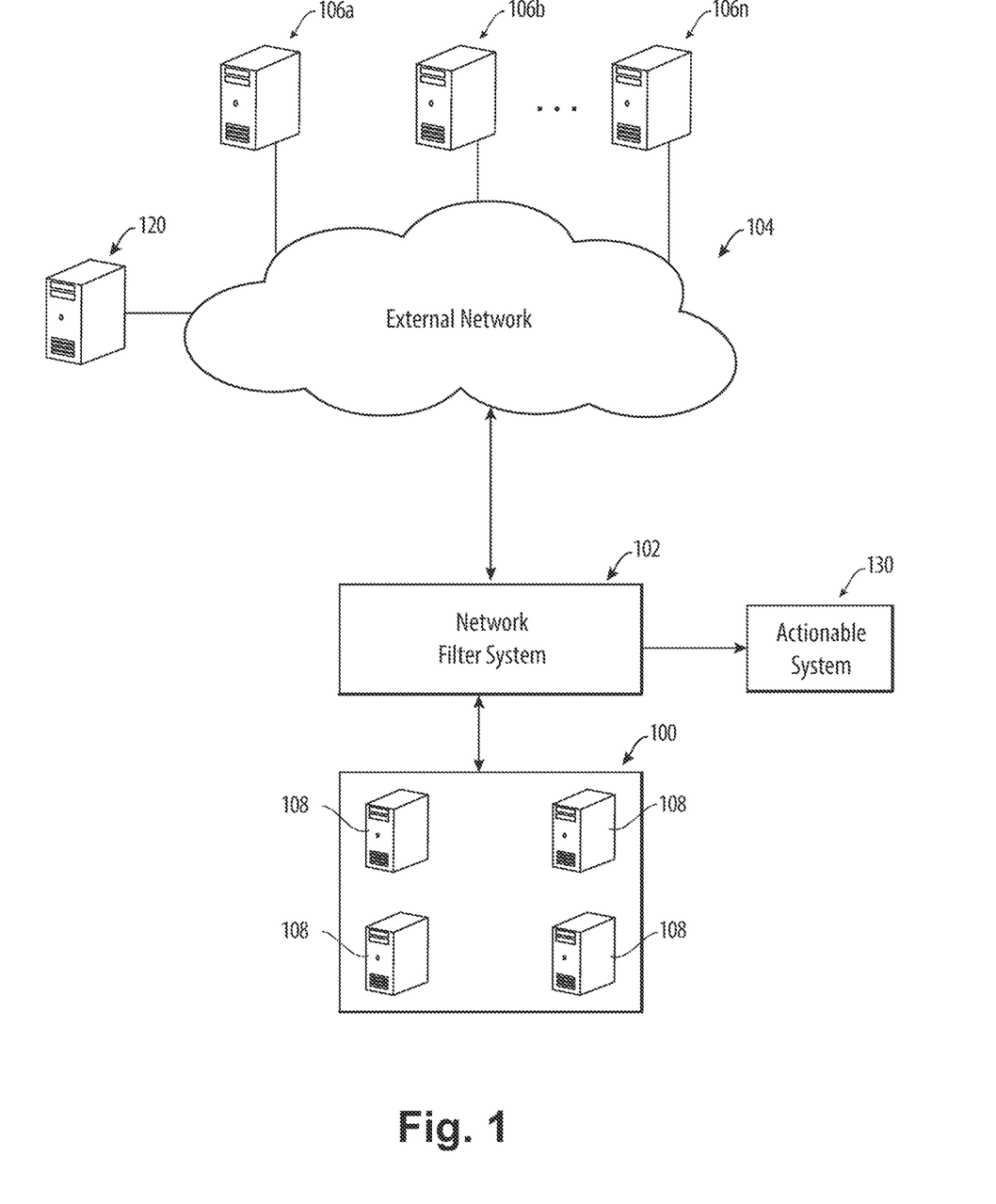
FIG. 1 illustrates a block diagram of an example filter system included in an example network environment, in accordance with an aspect of the disclosure.

Reference will now be made to the drawings wherein like reference numerals identify similar structural features or aspects of the subject disclosure. For purposes of explanation and illustration, and not limitation, a block diagram of an exemplary embodiment of a filter system in accordance with the disclosure is shown in FIG. 1 and is designated generally by reference character 102. Other embodiments of the filter system 102 in accordance with the disclosure, or aspects thereof, are provided in FIGS. 2-6, as will be described.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a disc, a memory storage device, or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

Description of certain illustrated embodiments of the present disclosure will now be provided. With reference now to FIG. 1, a filter system 102 is provided, wherein filter system 102 is provided in an example network environment. The example network environment includes an enterprise network 100 that having one or more enterprise devices 108, filter system 102, one or more actionable systems 130, an external network 104, and external devices 106a, 10b . . . 106n.

In a typical implementation, enterprise devices 108 and external devices 106a, 106b . . . 106n attempt to exchange communications via external network 104. Filter system 102 can monitor the communications being exchanged, such as for filtering to aid with protection and security for enterprise devices 108, parental controls, targeted advertising, network searching, etc. Communication in either direction, to or from enterprise devices 108, can be filtered by filter system 102, such as to detect an attack, whether from an external device 106a or an enterprise device 108 commandeered by stealthily installed malicious code (also known as a botnet).

The actionable system(s) 130 can be integrated or external from filter system 102. Filter system 102 and actionable system(s) 130, separately or together, can include a computer system, such as computer system 600 shown and described with respect to FIG. 6.

The filter system 102 and/or actionable system(s) 130 can be implemented as one or more physical or virtual devices. Whether implemented as physical or virtual device(s), filter system 102 and actionable system(s) 130 use a local or remote processing device having hardware or firmware that executes software instructions, which enables performance of the disclosed functions. Additionally, filter system 102 and actionable system(s) 130 can share one or more hardware, firmware, and/or software components.

Filter system 102 can include central or distributed elements for intercepting and/or analyzing network data. These elements can be passive or active and include software, firmware, and/or hardware components, such as taps, probes, or port mirrors. These elements can be positioned inline, and/or remote relative to communication links that connect to enterprise network 100.

In one or more embodiments, filter system 102 can be included within a router. In one or more embodiments, filter system 102 can be configured similar to devices such as Arbor Edge Defense™ or Arbor TMS by Arbor Networks, Inc. of Westford, Massachusetts.

In embodiments, filter system 102 can be located between the external network 104 and enterprise network 100, within enterprise network 100, or at the edge of enterprise network 100.

Network traffic filter 102 can include or access a packet capture system and/or a processing system having communication interfaces, such as an external high-speed network interface (not shown) and a protected high-speed network interface (not shown), for receiving, transmitting, and processing packets.

Actionable system(s) 130 can receive commands or control signals from filter system 102 that cause actions to be taken. Actionable system(s) 130 can control processes and/or devices. In one or more embodiments, actionable system(s) 130 can include a mitigation device that can apply selectable countermeasures to network traffic for mitigating an attack. Countermeasures can include, for example, redirecting network traffic to a selected destination (such as a scrubbing device), deny-listing a source (e.g., an IP address of the source) of suspicious traffic for future negative treatment, blocking traffic to prevent the traffic from being transmitted to its intended destination, dropping network traffic by not forwarding it to its intended destination, etc.

Filter system 102 can receive network traffic to or from enterprise network 100 in the form of a live stream of network traffic or a recorded snapshot of network packets. In embodiments, enterprise network 100 can be, for example, a school network, business network, an industrial network, and government network, to list a few non-limiting examples.

External devices 106a, 106b . . . 106n and enterprise devices 108 are computing devices having hardware, software and/or firmware, such as servers, laptop devices, mobile devices (e.g., laptops, smartphones, cell phones, and tablets), network elements (e.g., routers, switches, and firewalls), embedded computer devices that are embedded in other devices (e.g., appliances, tools, vehicles, or consumer electronics), and can each be implemented as one or more physical or virtual devices.

Enterprise network 100 and external network 104 can each include one or more networks, such as an intranet, a local area network (LAN), and/or a wide area network (WAN). In examples, enterprise network 100 can be a school network, business network, or government network, to list a few examples, that can connect to the Internet. External network 104 is external to enterprise network 100 and can be included in the Internet.

Figure 2:
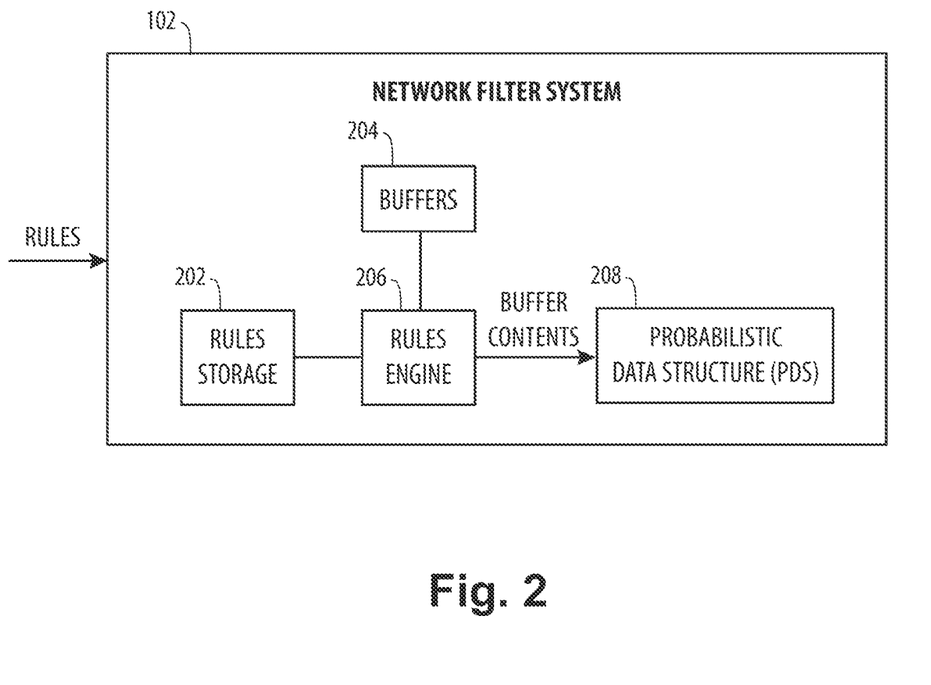
FIG. 2 illustrates a block diagram of the example filter system shown in FIG. 1, during a configuration stage, in accordance with an aspect of the disclosure.

With reference to FIG. 2, filter system 102 is shown in greater detail and during a configuration stage. Filter system 102 includes rules storage 202, buffers 204, a rules engine 206, and a probabilistic data structure (PDS) 208. During the configuration stage, contents of PDS 208 is configured based upon a set of rules. The set of rules is received as input and stored in rules storage.

A PDS 208 is designed to answer queries of the type "Is value X in the PDS?" There are two possible answers to such a query: "match" (value X is in the PDS) or "no match" (value X is not in the PDS). A "no match" response is 100% reliable; a "match" response is less than 100% reliable. The probability of a false positive match is small and can be made arbitrarily small (but never 0) by configuring the PDS appropriately. In general, the probability of false positives is reduced by trading runtime and memory efficiency for more reliability.

The set of rules is a flexible, user-specified set of rules that is used to extract one or more patterns. The flexibility provides a simple way to customize the filter system 102 by simply providing a new set of rules. Even after PDS 208 is configured with a set of rules, additional rules can be easily added at any time for further configuring PDS 208.

Each rule includes one or more field specifiers. Each field specifier includes a value specifier that specifies a value to be matched and a location specifier that specifies a location in input data to be filtered. In one or more embodiments, the location specifier includes an offset specifier and a length specifier, wherein the offset specifier specifies an offset of a data field from a reference location of the input data, and the length specifier specifies a length of the data field. In one or more embodiments, the offset and length are specified in bytes. In alternative embodiments the location specifier can be expressed in alternative ways.

In addition, each rule is configured to correspond to a set of one or more actions. The actions are described in more detail with reference to FIGS. 3 and 5 in which input data is processed. The rules, actions, and correspondence between rules and actions is all flexible and user selectable.

Rules engine 206 operates on each rule by initializing an empty buffer 204, and for each field specifier of the rule appending the value specified by the field specifier to the buffer. Once all the field specifiers are handled by rules engine 206, rules engine 206 then inserts the contents of the buffer in PDS 208 to be included with the PDS contents.

An example rule is shown, assuming that a single field specifier is represented using an example notation O:L:V, where "O" specifies the offset, "L" specifies the field length, and "V" specifies the value to be matched. An example Rule 1 having multiple field specifiers is shown below. In the example shown, the field specifiers are separated by commas. It is noted that in one or more embodiments, the rule can be written using different notations than shown in the example:

$$28:4:0x20202e2e, 42:2:0x6247, 98:6:0x414243444546 \qquad \text{Rule 1:}$$

Rule 1 specifies a value of length 4 at offset 28, a value of length 2 at offset 42, and a value of length 6 at offset 98. The '0x' prefix on the values indicates a hexadecimal value.

Figure 3:
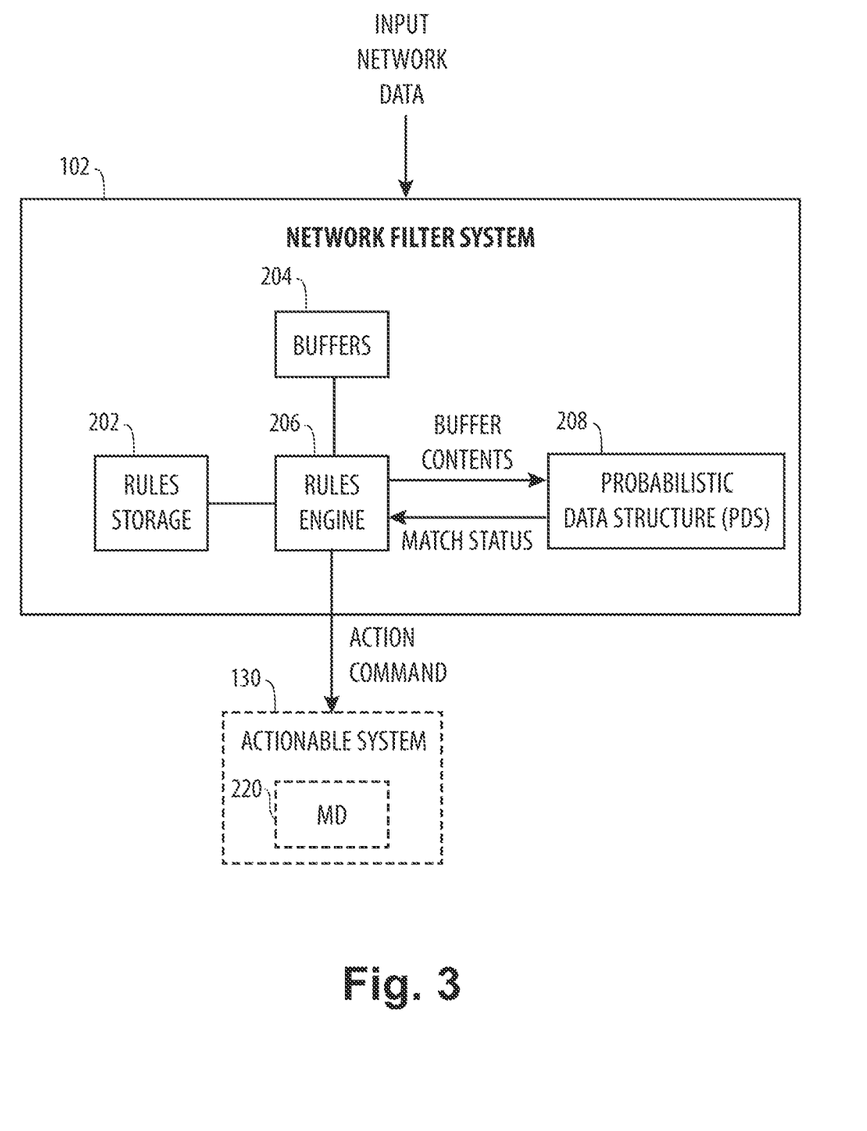
FIG. 3 illustrates a block diagram of the example filter system shown in FIG. 1, during a filtering stage, in accordance with an aspect of the disclosure.
Figure 5:
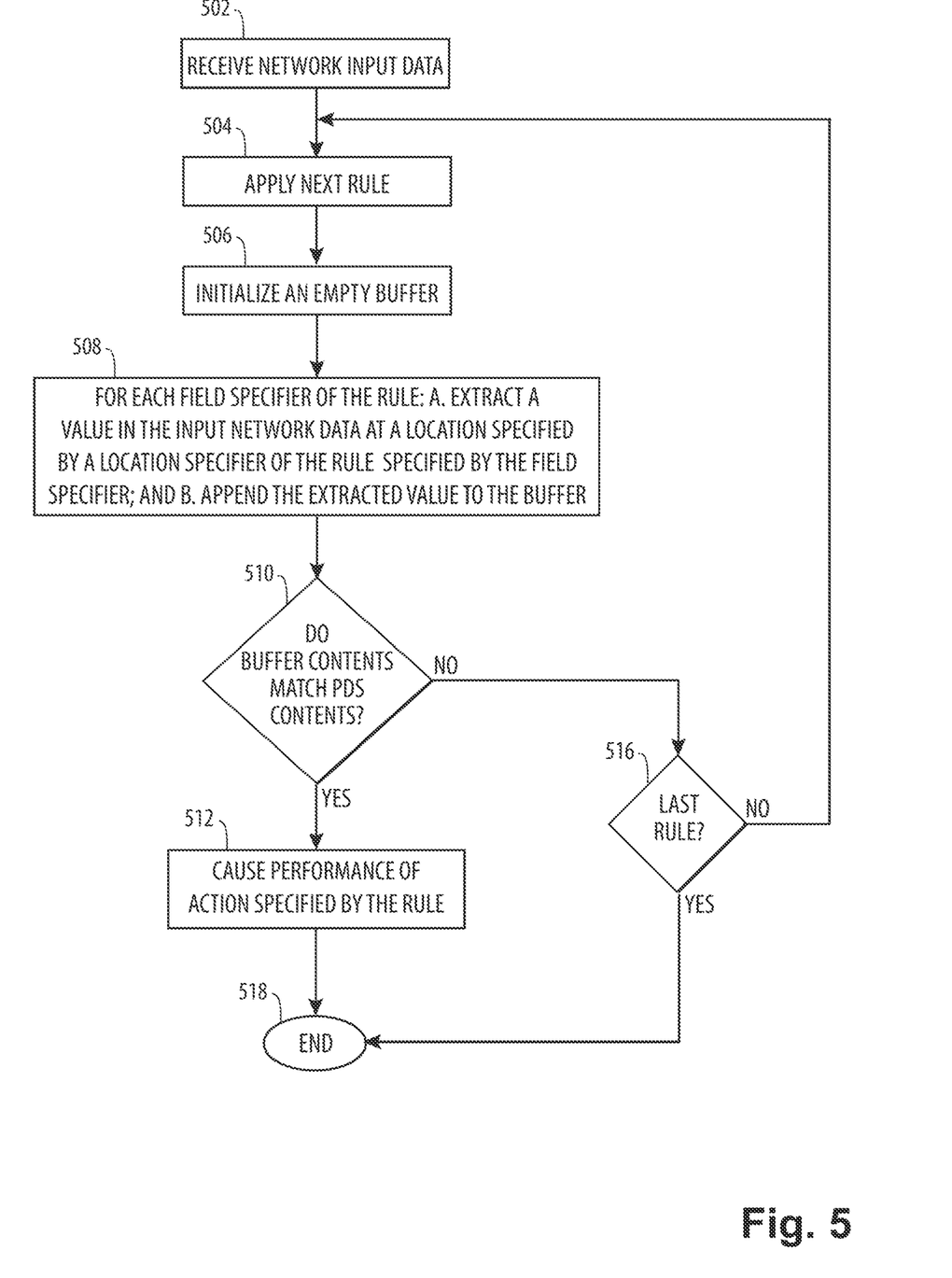
FIG. 5 is an example flowchart showing an example method performed by a filter system for filtering input network data, in accordance with an aspect of the disclosure.

PDS 208 is configured so that during a filtering stage, once a rule has been stored as contents in PDS 208, PDS 208 can be queried based on contents of input data that has been processed by rules engine (as described with respect to FIGS. 3 and 5). In response to the query, PDS 208 provides a response that indicates either that the contents are probably present, or definitely not present. The probability is adjustable by varying the construction parameters of PDS 208. In addition, rules engine 206 is configured for operation during the filtering stage to cause performance of a set of actions to which the rule corresponds, depending on the response from PDS 208. The set of actions can include one or more actions. In one or more embodiments, PDS 208 is a bloom filter. In alternative embodiments, PDS 208 can be a quotient filter or a cuckoo filter.

Rules storage 202, buffers 204, and PDS 208 can each be integrated with filter system 102 or external to, but accessible by, filter system 102.

With reference to FIG. 3, filter system 102 is shown in greater detail during a filtering stage once PDS 208 has already been configured based on a set of one or more rules. Filter system 102 receives input network data that is to be filtered and applies each rule to the input data. The input data can be an IP packet of network data that was received by a network device. Rules engine 206 applies each rule of the set of rules to the input data.

Each packet can be handled separately by applying each of the rules to the packet, at least until a match is found with contents of PDS 208. Once matching contents have been found in PDS 208 for a rule, a set of actions to which the rule corresponds can be performed. Filter system 102 can be configured to proceed by processing a next packet of the input network data, or to continue applying additional rules of the set of rules until a condition is met, such as (without limitation to a particular condition) all rules have been applied, a timeout condition has occurred, or matches have been found for a threshold number of rules.

For each rule of the set of rules, rules engine 206 initializes an empty buffer of buffers 204. For each field specifier in the rule, rules engine 206 extracts a value in the input data at the location in the input data specified by the location specifier and having the length specified by the length specifier and appends the extracted value to the buffer. Once all field specifiers in the rule have been handled, rules engine 206 determines whether contents of the buffer match contents of PDS 208 by querying PDS 208 with the contents of the buffer.

PDS 208 responds to the query with a match status. A positive match status indicates that the buffer contents match PDS 208 contents with a high probability. A negative match status indicates that the buffer contents definitely are not present in PDS 208. Rules engine 206 causes a set of actions to which the rule corresponds to be performed when the match status is positive, such as by sending a command or control signal to actionable system 130, or notifying the actionable system 130 in order that actionable system 130 can perform the set of actions. Algorithms underlying PDS 208 result in a negative match of 100% certainty. A positive match is less than certain due to a possibility of hash collisions.

In one or more embodiments, the rule can identify a network attack and a positive match status can indicate a need for mitigation of the network attack. The set actions that are caused to be performed can include one or more actions to mitigate the network attack. Actionable system 130 can optionally include a mitigation device. Rules engine 206 can control the mitigation device to perform the mitigation action or can notify the mitigation device in order that the mitigation device can generate control signals and/or commands for controlling performance of a mitigation action.

Figure 4:
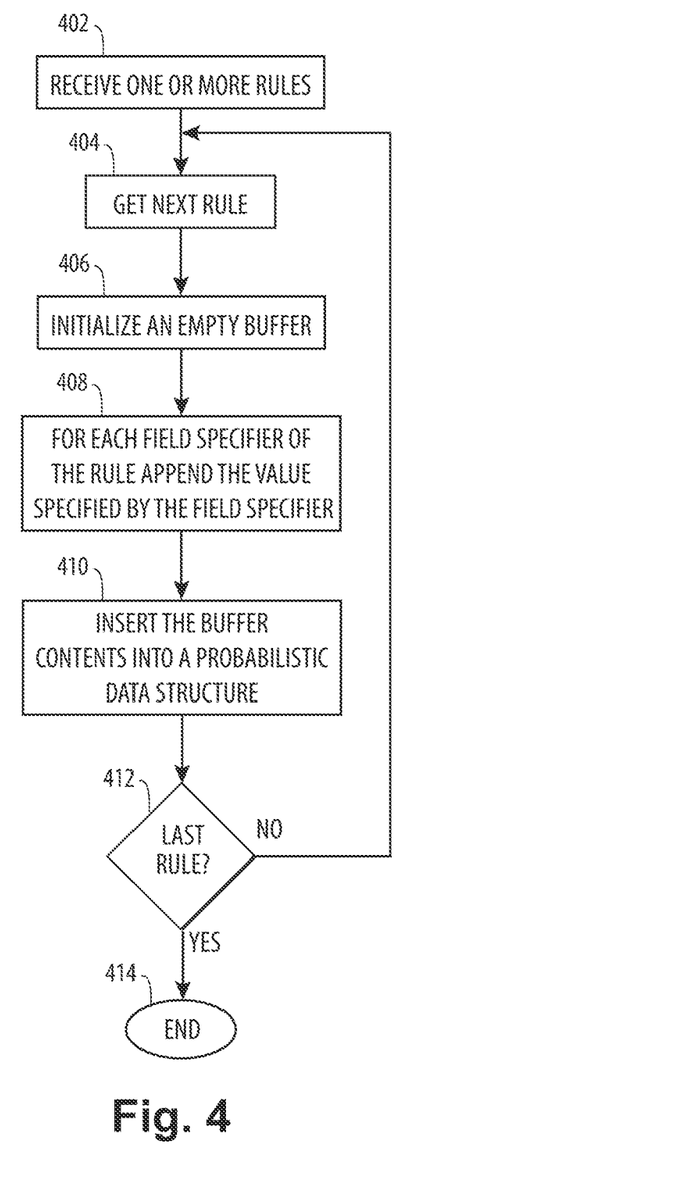
FIG. 4 is an example flowchart showing an example method performed for configuring a filter system, in accordance with an aspect of the disclosure.

With reference now to FIGS. 4 and 5, shown are flowcharts demonstrating implementation of the various exemplary embodiments. It is noted that the order of operations shown in FIGS. 4 and 5 is not required, so in principle, the various operations may be performed out of the illustrated order. Also, certain operations may be skipped, different operations may be added or substituted, some operations may be performed in parallel instead of strictly sequentially, or selected operations or groups of operations may be performed in a separate application following the embodiments described herein.

Language that refers to the exchange of information is not meant to be limiting. For example, the term "receive" as used herein refers to obtaining, getting, accessing, retrieving, reading, or getting a transmission. Use of any of these terms is not meant to exclude the other terms. Data that is exchanged between modules can be exchanged by a transmission between the modules or can include one module storing the data in a location that can be accessed by the other module.

FIG. 4 shows a flowchart of operations for configuring a PDS, such as PDS 208 shown in FIG. 1. The operations can be performed by a rules engine, such as rules engine 206 shown in FIG. 2. The method begins with receiving a set of one or more rules. The rules can be received via a user interface, such as a graphical user interface (GUI) or textual interface. Each rule includes one or more field specifiers, each field specifier including a value specifier that specifies a value to be matched and a location specifier that specifies a location in input data to be filtered. The location specifier can include an offset specifier that specifies an offset of a data field from a reference location of the input data and a length specifier that specifies a length of the data field.

The method for configuring the PDS begins at block 402. Block 404 begins a loop that is repeated until each rule of the rule set is accessed and processed as the current rule. The loop includes blocks 404, 406, 408, 410, and 412. At block 404, the next rule is accessed for processing the rule. The first rule of the rule set is accessed during the first iteration of the loop. At step 406, an empty configuration buffer is initialized for the rule. The configuration buffer can be included in buffers 204 shown in FIG. 2, for example. At block 408, each field specifier of the current rule is accessed and processed. For each field specifier, values specified by the field specifier are appended to the configuration buffer. At block 410, after all of the field specifiers for the rule have been processed, the configuration buffer contents are inserted into a PDS, such as PDS 208.

At decision block 412, it is determined whether the current rule is the last rule of the rule set. If it is determined at block 412 that the current rule is not the last rule, the loop is repeated, starting at block 404. If it is determined at block 412 that the current rule is the last rule, the method for configuring the PDS is ended at block 414.

FIG. 5 shows a flowchart of operations for filtering input network traffic using the configured PDS. The operations can be performed by a rules engine, such as rules engine 206 shown in FIG. 2. The method begins with receiving input network data, such as an IP packet, but not limited to a particular type of data.

Block 504 begins a loop for applying each rule of the set of one or more rules. The loop is repeated until each rule of the set of one or more rules is accessed and processed as the current rule. The loop includes blocks 504, 506, 508, 510, 512, 514, and 516. At block 504, the next rule is accessed for applying the rule. The first rule of the rule set is accessed during the first iteration of the loop. At block 506, an empty filter buffer is initialized for the rule being applied. The filter buffer for applying the PDS can be included in buffers 204 shown in FIG. 2, for example.

At block 508, for each field specifier of the rule being applied, (a) extract a value in the input network data (e.g., packet) at a location specified by a location specifier of the rule's field specifier, and (b) append the extracted value to the filter buffer. At determination block 510, a determination is made whether contents of the filter buffer match the PDS contents.

The determination performed at block 510 can include submitting a query that includes the filter buffer contents to the PDS. The PDS responds with a match status that can be positive or negative. If the match status is positive, this indicates that the filter buffer's contents match the current rule.

Each rule of the rule set can correspond to a set of one or more actions to be performed when the match status is positive. Accordingly, at block 512, when it is determined at block 510 that YES, a positive match status is received, the action(s) to which the rule being processed corresponds are caused to be performed. Depending on desire, the method can end at block 518 after causing performance of the action. Thus, only one action is performed per input network data (e.g., packet). Alternatively, after causing performance of the action, the method could continue at determination block 516 to determine whether the last rule has been applied yet. The number of matches and actions caused to be performed can be limited to a predetermined amount, or can be unlimited.

If the determination at block 510 is NO, meaning a positive match status is not received, the method continues at block 516. At decision block 516, it is determined whether the current rule is the last rule of the rule set. If it is determined at block 516 that the current rule is not the last rule, the loop is repeated, starting at block 504. If it is determined at block 516 that the current rule is the last rule, the method for matching input data against the PDS is ended at block 518.

Possible advantages include flexibility resulting from the ability to configure the PDS with any set of rules and to use that set of rules to filter the network traffic. The number of rules is not limited. The input data can be of any type, whether an IP packet, text or binary files, database query results, or any other type of digitally encoded data. The actions associated with the rules that are caused to be performed can be of any type, further providing flexibility to filter system 102.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
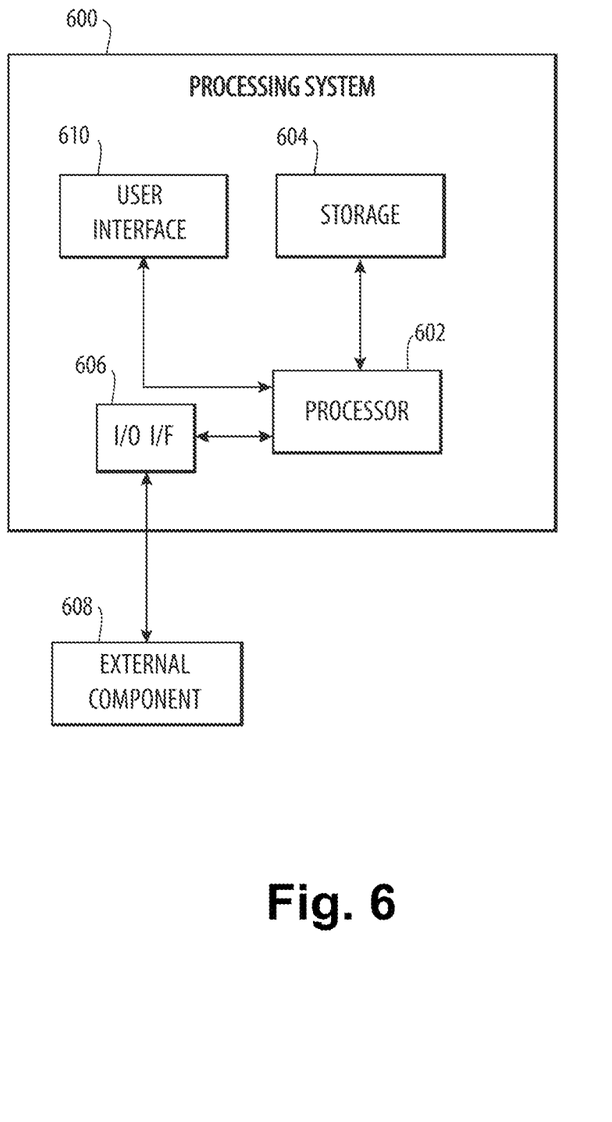
FIG. 6 illustrates an example computing system that could be used to implement the filter system shown in FIG. 1.

With reference to FIG. 6, a block diagram of an example computing system 600 is shown, which provides an example configuration of the processing components of filter system 102. Additionally, all or portions of the processing components of filter system 102 could be configured as software, and computing system 600 could represent such portions. Computing system 600 is only one example of a suitable system and is not intended to suggest any limitation as to the scope of use or functionality of embodiments of the disclosure described herein. Computing system 600 can be implemented using hardware, software, and/or firmware. Regardless, computing system 600 is capable of being implemented and/or performing functionality as set forth in the disclosure.

Computing system 600 is shown in the form of a general-purpose computing device. Computing system 600 includes a processing device 602, memory 604, an input/output (I/O) interface (I/F) 606 that can communicate with an internal component, such as a user interface 610, and optionally an external component 608.

The processing device 602 can include, for example, a programmable logic device (PLD), microprocessor, DSP, a microcontroller, an FPGA, an ASIC, and/or other discrete or integrated logic circuitry having similar processing capabilities.

The processing device 602 and the memory 604 can be included in components provided in the FPGA, ASIC, microcontroller, or microprocessor, for example. Memory 604 can include, for example, volatile and non-volatile memory for storing data temporarily or long term, and for storing programmable instructions executable by the processing device 602. Memory 604 can be a removable (e.g., portable) memory for storage of program instructions. I/O I/F 606 can include an interface and/or conductors to couple to the one or more internal components 610 and/or external components 608.

Embodiments of the processing components of filter system 102 may be implemented or executed by one or more computer systems, such as a microprocessor. Each computer system 600 can be included within processing components of filter system 102, or multiple instances thereof. In the example shown, computer system 600 is embedded in the processing components of filter system 102. In various embodiments, computer system 600 may include one or more of a microprocessor, an FPGA, application specific integrated circuit (ASIC), microcontroller. The computer system 600 can be provided as an embedded device. Portions of the computer system 600 can be provided externally, such by way of a centralized computer, or the like.

Computer system 600 is only one example of a suitable system and is not intended to suggest any limitation as to the scope of use or functionality of embodiments of the disclosure described herein. Regardless, computer system 600 is capable of being implemented and/or performing any of the functionality set forth hereinabove.

Computer system 600 may be described in the general context of computer system-executable instructions, such as program modules, being executed by a computer system. Generally, program modules may include routines, programs, objects, components, logic, data structures, and so on that perform particular tasks or implement particular abstract data types.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The scope of the present disclosure is not limited to the specific embodiments described in the disclosure. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the disclosed aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

The invention claimed is:

1. A method of configuring a filter to perform pattern matching against input data, the method comprising:
   receiving one or more rules, each rule including one or more field specifiers, each field specifier including a value specifier that specifies a value to be matched and a location specifier that specifies a location in the input data;
   for each rule of the one or more rules:
      initializing an empty buffer;
      for each field specifier:
         appending the value specified by the field specifier to the buffer; and
         inserting the buffer contents into contents of a probabilistic data structure representing all of the field specifiers of the rule,
         wherein the probabilistic data structure is configured to receive a query that includes query buffer contents determined from the input data and respond with a match status of probably present based on a predetermined probability, or definitely not present.

2. The method of claim 1, wherein the location specifier includes an offset specifier and a length specifier, wherein the offset specifier specifies an offset of a data field from a reference location of the input data, and the length specifier specifies a length of the data field.

3. The method of claim 1, wherein the offset and length are specified in bytes.

4. The method of claim 1, wherein the input data includes IP packets received on a network device.

5. The method of claim 1, wherein each rule of the one or more rules corresponds to a set of one or more actions to be performed when the match status is positive for the rule.

6. The method of claim 5, wherein a positive output match status indicates a need for mitigation of a network attack and the set of one or more actions include an action to mitigate the network attack.

7. The method of claim 1, wherein the probabilistic data structure is a bloom filter.

8. A method of packet filtering, the method comprising:
   receiving input data;
   applying one or more rules, each rule including one or more field specifiers, each field specifier including a value specifier that specifies a value to be matched and a location specifier that specifies a location in the input data, including:
      for each rule of the one or more rules, at least until a match is found in contents of the probabilistic data structure:
         initializing an empty buffer;
         for each field specifier in the rule:
            extracting a value in the input data at the location in the input data specified by the location specifier; and
            appending the extracted value to the buffer;
         determining a match status of contents of the buffer relative to previously inserted contents of the probabilistic data structure, wherein the contents of the probabilistic data structure represent field specifiers of the one or more rules, and the match status indicates whether the contents of the buffer are probably present in the contents of the probabilistic data structure based on a predetermined probability or are definitely not present in the contents of the probabilistic data structure.

9. The method of claim 8, wherein the location specifier includes an offset specifier and a length specifier, wherein the offset specifier specifies an offset of a data field from a reference location of the input data, and the length specifier specifies a length of the data field.

10. The method of claim 9, wherein the offset and length are specified in bytes.

11. The method of claim 8, wherein the input data includes an IP packet received on a network device.

12. The method of claim 8, wherein the probabilistic data structure is a bloom filter.

13. The method of claim 8, wherein determining a match status comprises:
   submitting a query including buffer contents to the probabilistic data structure; and
   receiving a response from the probabilistic data structure that includes a match status, wherein a positive match status indicates that the buffer contents match a rule contained in the probabilistic data structure.

14. The method of claim 13, wherein each rule of the one or more rules corresponds to a set of one or more actions to be performed when the match status is positive when processing the rule.

15. The method of claim 14, further comprising, when the match status is positive when processing a rule of the one or more rules, causing the set of one or more actions to which the rule corresponds to be performed.

16. The method of claim 15, wherein the positive match status indicates a need for mitigation of a network attack, and the set of one or more actions include an action to mitigate the network attack.

17. A computer system for packet filtering the computer system comprising:
   a memory configured to store instructions;
   processor disposed in communication with said memory, wherein said processor upon execution of the instructions is configured to:
   receive one or more rules, each rule including one or more field specifiers, each field specifier including a value specifier that specifies a value to be matched and a location specifier that specifies a location in the input data;
   for each rule of the one or more rules:
      initialize an empty buffer;
      for each field specifier:
         append the value specified by the field specifier to the buffer; and
         insert the buffer contents into contents of a probabilistic data structure representing all of the field specifiers of the rule,
         wherein the probabilistic data structure is configured to receive a query that includes query buffer contents determined from the input data and respond with a match status of probably present based on a predetermined probability, or definitely not present.

18. The computer system of claim 17, wherein the location specifier includes an offset specifier and a length specifier, wherein the offset specifier specifies an offset of a data field from a reference location of the input data, and the length specifier specifies a length of the data field.

19. A computer system for packet filtering the computer system comprising:
   a memory configured to store instructions;
   processor disposed in communication with said memory, wherein said processor upon execution of the instructions is configured to:

receive input data;
apply one or more rules, each rule including one or more field specifiers, each field specifier including a value specifier that specifies a value to be matched and a location specifier that specifies a location in the input data, including:
    for each rule of the one or more rules, at least until a match is found in contents of the probabilistic data structure:
        initialize an empty buffer;
        for each field specifier in the rule:
            extract a value in the input data at the location in the input data specified by the location specifier; and
            append the extracted value to the buffer;
        determine a match status of contents of the buffer relative to previously inserted contents of the probabilistic data structure, wherein the contents of the probabilistic data structure represent field specifiers of the one or more rules, and the match status indicates whether the contents of the buffer are probably present in the contents of the probabilistic data structure based on a predetermined probability or are definitely not present in the contents of the probabilistic data structure.

20. The computer system of claim 19, wherein when determining a match status, the processor upon execution of the instructions is further configured to:
    submit a query including buffer contents to the probabilistic data structure; and
    receive a response from the probabilistic data structure that includes a match status, wherein a positive match status indicates that the buffer contents match a rule contained in the probabilistic data structure.

* * * * *